United States Patent [19]

Shimoda et al.

[11] Patent Number: 5,474,802
[45] Date of Patent: Dec. 12, 1995

[54] PROCESS FOR PRODUCING A DOUBLE-LAYER FILM

[75] Inventors: Hiroshi Shimoda; Noriyuki Yoshihara, both of Yokohama; Yoshiyuki Kuwabara, Aichi, all of Japan

[73] Assignees: Asahi Glass Company Ltd., Tokyo, Japan; Saint Gobain Vitrage International, Courbevoie, France

[21] Appl. No.: 267,520

[22] Filed: Jun. 29, 1994

[30] Foreign Application Priority Data

Jun. 30, 1993 [JP] Japan .................................... 5-187273

[51] Int. Cl.⁶ .............................. B05D 5/06; B05D 1/36; B32B 27/40
[52] U.S. Cl. ................... 427/163.1; 427/165; 427/333; 427/412.3; 427/412.5; 427/407.1
[58] Field of Search ............................ 156/501; 427/333, 427/407.1, 410, 408, 407.3, 165, 412.3, 412.5, 163.1

[56] References Cited

U.S. PATENT DOCUMENTS

| | | | |
|---|---|---|---|
| 4,254,176 | 3/1981 | Müller et al. | 428/220 |
| 4,337,296 | 6/1982 | Varadhachary | 427/333 |
| 4,383,759 | 5/1983 | Bloothoofd et al. | 156/501 |
| 4,749,586 | 6/1988 | Bravet et al. | 427/163.1 |
| 4,891,271 | 1/1990 | Bravet et al. | 428/423.1 |
| 4,895,738 | 1/1990 | Zimmerman et al. | 427/333 |
| 4,983,461 | 1/1991 | Daude et al. | 427/163.1 |
| 5,091,214 | 2/1992 | Muller et al. | 427/165 |
| 5,116,442 | 5/1992 | Daude et al. | 427/165 |
| 5,141,783 | 8/1992 | Corsi et al. | 427/412.5 |
| 5,268,136 | 12/1993 | Girard et al. | 264/216 |
| 5,277,944 | 1/1994 | Holzer et al. | 427/412.1 |

FOREIGN PATENT DOCUMENTS

| | | |
|---|---|---|
| 0161184 | 11/1985 | European Pat. Off. . |
| 0287861 | 10/1988 | European Pat. Off. . |
| 0344045 | 11/1989 | European Pat. Off. . |
| 0391166 | 10/1990 | European Pat. Off. . |
| 0430769 | 6/1991 | European Pat. Off. . |
| 0451030 | 10/1991 | European Pat. Off. . |
| 0548690 | 6/1993 | European Pat. Off. . |
| 3606028 | 8/1986 | Germany . |
| 62-187025 | 8/1987 | Japan . |
| 63-37930 | 2/1988 | Japan . |
| 2247632 | 11/1992 | United Kingdom . |

*Primary Examiner*—Diana Dudash
*Attorney, Agent, or Firm*—Oblon, Spivak, McClelland, Maier & Neustadt

[57] ABSTRACT

A process for producing a double-layer film on a flat substrate by reactive casting employing two kinds of reaction-curable resin raw material mixtures substantially free from a solvent, which comprises casting onto the substrate a first unreacted liquid raw material mixture for the first layer, then casting onto the first layer a second unreacted liquid raw material mixture for the second layer while the first raw material mixture still retains its fluidity, and thereafter curing by reaction the two layers simultaneously.

9 Claims, 2 Drawing Sheets

FIGURE 3 (a)
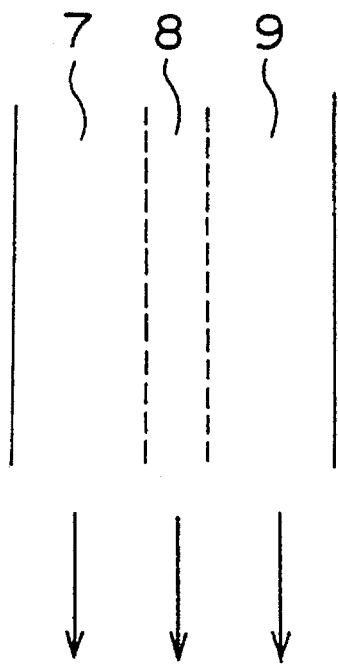
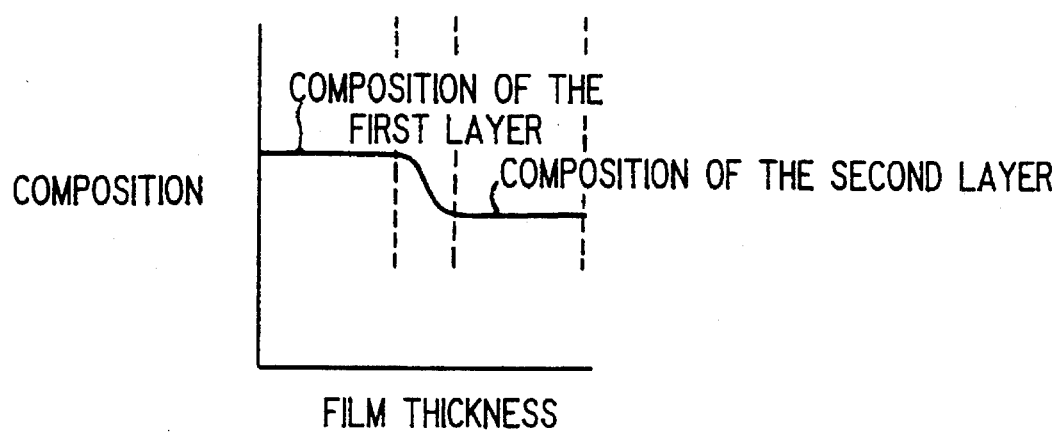
FIGURE 3 (b)

PROCESS FOR PRODUCING A DOUBLE-LAYER FILM

The present invention relates to a process for producing a double-layer film having excellent interlaminar bond strength.

Heretofore, a process for producing a double-layer film by supplying unreacted liquid raw materials onto a substrate, has been proposed in Japanese Unexamined Patent Publication No. 162618/1981, U.S. Pat. No. 4,935,264 and U.S. Pat. No. 5,084,325. However, in such a conventional process, a raw material for the first layer supplied on the substrate, is reacted for curing, and after the curing of the first layer, a raw material for the second layer is supplied. Therefore, the adhesion between the two layers tends to be inadequate. Accordingly, delamination at the interface is likely to occur due to a load such as a tension or swelling. Especially, after various durability tests, a marked decrease in the adhesive strength and interfacial delamination are observed. This causes a serious problem in practical use.

Further, since the respective layers have different refractive indexes, an optical distortion in light transmittance takes place at the interface. Therefore, this process is not suitable as a practical process for the production of a film which is required to have a high optical quality.

Further, it is difficult to make the first layer thin in a case where the substrate is coated with a release agent, because dewetting occurs on the substrate during the curing reaction after the casting of the raw material for the first layer.

It is an object of the present invention to provide a new process for producing a double-layer film, whereby the above-mentioned problems of the conventional process can be solved. Namely, the object of the present invention is to provide a process for producing a double-layer film by casting unreacted liquid raw material mixtures onto a substrate and then reacting and curing them, whereby the adhesive strength between the two layers is increased and at the same time, an optical distortion is reduced, and the first layer can be made thin.

Thus, the present invention provides a process for producing a double-layer film on a flat substrate by reactive casting employing two kinds of reaction-curable resin raw material mixtures substantially free from a solvent, which comprises casting onto the substrate a first unreacted liquid raw material mixture for the first layer, then casting onto the first layer a second unreacted liquid raw material mixture for the second layer while the first raw material mixture still retains its fluidity, and thereafter curing by reaction the two layers simultaneously.

BRIEF DESCRIPTION OF THE DRAWINGS

In the accompanying drawings:

FIG. 3($a$) is a schematic sectional view of a double-layer film and FIG. 3($b$) is a schematic representation of the change of its composition across the thickness.

Now, the present invention will be described in detail with reference to the preferred embodiments.

Figure 1:
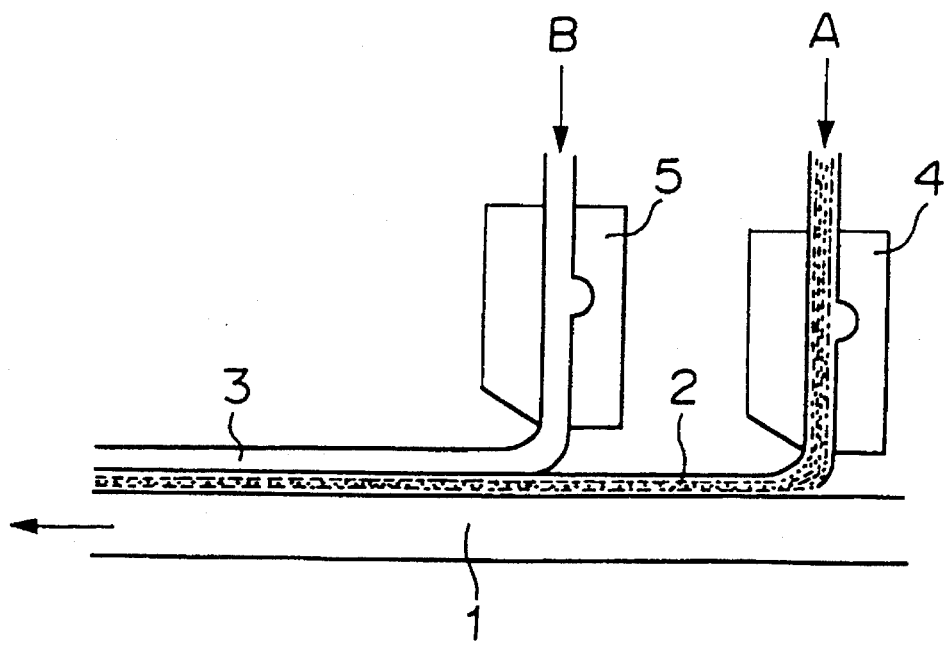
FIG. 1 is a schematic cross-sectional view illustrating a process for casting the second layer continuously after the formation of the first layer on a running substrate.

As shown in the cross-sectional view of FIG. 1, in the process of the present invention, firstly, a raw material mixture A for the first layer is stirred, mixed and then cast from a nozzle 4 for the first layer onto the surface of a flat substrate 1, and immediately thereafter, a raw material mixture B for the second layer stirred and mixed simultaneously, is cast from a nozzle 5 for the second layer onto the first layer which still has its fluidity in a liquid state, to form a second layer 3.

Figure 2:
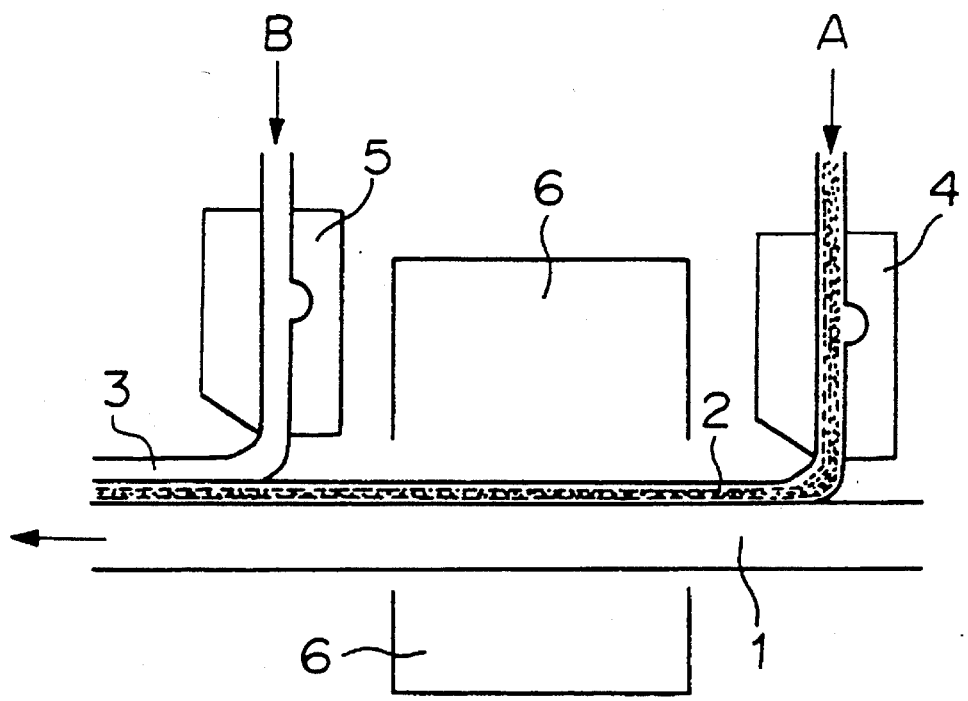
FIG. 2 is a schematic cross-sectional view illustrating a process for casting the second layer after a preliminary reaction of the first layer formed on a running substrate.

Further, in a case where heating is required to promote the reaction, it is possible to adopt a method as shown in FIG. 2 wherein a raw material mixture A for the first layer is cast from a nozzle 4 onto a running flat substrate, then preheating is conducted by a heating means such as an oven 6 under such mild conditions for heating temperature and heating time that the reaction will not proceed abruptly or the first layer 2 will retain its fluidity after the heating, and thereafter a raw material mixture B for the second layer is cast from a nozzle 5 onto the first layer 2 to form a second layer 3. In such a case, uniformity of the thickness of the first layer can be improved by the leveling effect in the preheating step, whereby the optical quality of the film will be improved.

At the time when the second layer 3 is cast on the first layer 2 by the above mentioned method, the respective layers have sufficient fluidity so that physical mixing takes place at the interface of the two layers. This is schematically illustrated in FIG. 3. FIG. 3($a$) is a cross-sectional view of the double-layer film, and FIG. 3($b$) illustrates the change in the composition in the thickness direction of the double-layer film. As shown in FIGS. 3($a$) and 3($b$), the double-layer film obtained by the process of the present invention has a transition layer 8 at the interface between the first layer 7 and the second layer 9, in which the raw material mixtures for the two layers are mixed with each other. Within the transition layer 8, the composition gradually changes from the composition of the first layer to the composition of the second layer, and thus no distinct interface exists.

Thus, within the transition layer 8, the two layers 7 and 9 are intermingled, whereby the interlaminar bond strength will be very high due to the anchoring effect. In a case where the raw material mixtures of the two layers are mutually reactive with each other for curing, a chemical bond strength will be formed between the layers, and it adds to the interlaminar bond strength in combination with the above anchoring effect.

Further, within the transition layer, the refractive index gradually changes, whereby the optical distortion in the light transmittance will be reduced, and a film having a high optical quality can be obtained.

In a case where the substrate is coated with a release agent, it has been difficult to make the first layer thin to a level of e.g. not more than 100 μm, since the dewetting occurs on the substrate surface during the curing reaction after casting the raw material mixture for the first layer. Whereas, in the process of the present invention, immediately after the casting the first layer, the second layer is cast thereon to cover it, so that the film thickness increases, whereby the dewetting can be prevented, and it is possible to produce a double-layer film having a thin first layer.

As another method for casting onto the substrate two layers composed of unreacted raw material mixtures, a method may be conceivable which comprises combining two flows of unreacted raw material mixtures in a single nozzle as in the case of coextrusion of thermoplastic resins and then casting the combined flow onto the substrate. However, such a method has a problem that depending upon the viscosities of the liquid raw material mixtures for the two layers, the raw material mixtures tend to be totally mixed to form a single layer, or when the balance in supplying the raw material mixtures for the respective layers changes even a little, the raw material mixtures may likely be totally mixed to form a single layer. Therefore, the combination of the raw material mixtures will be limited, or the adjustment of the raw materials will be very difficult. Whereas, according to the process of the present invention, the combination of the raw material mixtures for the respective layers can be selected within a wide range, and even if the balance of the supply of the liquid raw material mixtures changes to some extent, there will be no such a problem that the entire layers are mingled, whereby the production of the laminated film is easy and suitable for the industrial application.

In the process of the present invention, it is important that the first layer is in a fluid state when the raw material mixture for the second layer is cast thereon. To this end, it is advisable to maintain the reaction rate of the first layer to a level of not more than 80%, more preferably not more than 50%. If the reaction rate exceeds the above value, the fluidity of the first layer tends to be inadequate, and the mixing at the interface with the a raw material mixture for the second layer tends to be inadequate, whereby the interlaminar bond strength will be low, and the optical distortion will increase.

The double-layer film of the present invention preferably has a total thickness of from 0.04 to 4 mm, more preferably from 0.04 to 2 mm. The thickness of each layer is preferably from 0.04 to 2 mm.

The flat substrate i.e. the support is preferably an inorganic glass sheet or a plastic film having a thickness of from 1 to 10 mm. Particularly preferred is a biaxially stretched polypropylene film or a biaxially stretched polyethylene terephthalate film having a thickness of from 0.03 to 0.3 mm which can be run in a sufficiently flat state under tension.

A polyurethane resin is particularly preferred as the material of each layer of the double-layer film produced by the process of the present invention. In this case, the reactive liquid raw material mixture comprises a polyol and a polyisocyanate compound as the main raw material components, and it further contains a chain extender such as a raw molecular weight polyol or polyamine in many cases, and a small amount of a catalyst may usually be incorporated. Further, if necessary, a coloring agent, an ultraviolet absorber, an antioxidant, a stabilizer such as a light stabilizer or a moldability-improving agent such as a leveling agent to improve the fluidity or wettability of the reactive raw material mixture in the cast molding, may be incorporated. It is desirable that such a raw material mixture is substantially free from a solvent. The casting method of such a reactive raw material mixture free from a solvent is called a bulk casting method.

The above polyol is preferably a polyester polyol, a polycarbonate polyol, a polytetraoxymethylene polyol or a combination thereof. Each polyol may be a combination of polyols having different molecular weights and hydroxyl values. The molecular weight is preferably from about 20 to 500, particularly from 40 to 400 in terms of the hydroxyl value, and the number of hydroxyl groups is preferably from about 2 to 4, more preferably from 2 to 3. These values are average values when two or more polyols are used in combination. In a case where a polyol having a high molecular weight (or a low hydroxyl value), it is preferred to use a chain extender.

The chain extender is usually a low molecular weight (usually not more than 200) polyol or a relatively low molecular weight polyamine, such as ethylene glycol, 1,4-butandiol, 1,6-hexanediol, diethanolamine, dimethylolpropionic acid, hexamethylenediamine or isophorondiamine. As the polyisocyanate, a polyisocyanate having no isocyanate group directly bonded to an aromatic group, may, for example, be used. Specifically, it may, for example, be preferably methylenebis(cyclohexylisocyanate), isophorone diisocyanate, hexamethylene diisocyanate, xylylene diisocyanate, or their modified products such as urea modified products, prepolymer type modified products, or amide modified products.

Particularly preferred are alicyclic isocyanates, aliphatic diisocyanate and modified products thereof.

A polyurethane resin will be obtained by reacting and curing a mixture prepared by mixing these reactive raw materials or by mixing a prepolymer obtained by partially reacting such reactive materials, with the rest of the raw materials.

It is preferred that one of the two polyurethane resin layers is a polyurethane resin layer having a good mechanical property, particularly a polyurethane resin layer having a good energy absorbing property and penetration resistance, and the other polyurethane resin layer is made of a polyurethane resin having a good surface property, particularly a good self-healing surface property. Particularly preferred as a polyurethane resin having a good surface property is a polyurethane resin having a self-healing property. Such a polyurethane resin is disclosed, for example, in Japanese Examined Patent Publications No. 2879/1988, No 31361/1988, No. 60990/1987, No. 60989/1987 and No. 27050/1982 and Japanese Unexamined Patent Publication No. 71252/1985.

Such a double-layer polyurethane laminated film wherein one layer has a good energy-absorbing property and high penetration resistance and the other layer has a good self-healing surface property, is useful for the production of a safety glass of bilayer type, as laminated on various glass sheets for automobiles, buildings or vehicles, by virtue of such properties. In such a case, it is possible to provide a safety glass which is excellent in the safety against collision and is highly resistant against scratching, by laminating the double-layer film so that layer with a good energy absorbing property and high penetration resistance is located on the glass plate side, and the layer with a good self-healing property constitutes the exposed surface.

Now, the present invention will be described in further detail with reference to Examples. However, it should be understood that the present invention is by no means restricted by such specific Examples.

EXAMPLE 1

A double-layer film was prepared from polyurethane resins of the following formulations. Polyurethane resin for the first layer (which has a self-healing surface property):

| | |
|---|---|
| Polyol (total) | 100 pbw |
| polycaprolactonetriol (MW = 300) | 45 pbw |
| polycaprolactonetriol (MW = 800) | 45 pbw |
| polycaprolactonediol (MW = 2300) | 4 pbw |
| Additives* | 5.8 pbw |
| Isocyanate (total) | 100 pbw |
| Hexamethylene diisocyanate trimer | 82 pbw |
| Hexamethylene diisocyanate monomer | 18 pbw |

*including a light stabilizer, an antioxidant, an UV light absorber, a reaction accelerator, a leveling agent, etc.)

Polyurethane resin for the second layer (which has an energy-absorbing property and penetration resistance):

| | |
|---|---|
| Polyol (total) | 100 pbw |
| Polycaprolactonediol (MW = 1200) | 50 pbw |
| Polycaprolactonetriol (MW = 800) | 9 pbw |
| Polyaliphatic carbonate diol (MW = 2000) | 16 pbw |
| Polyaliphatic carbonate diol (MW = 850) | 16 pbw |
| 1,4-butanediol | 7.3 pbw |
| Additives* | 1.7 pbw |
| *including a light stabilizer, an UV light absorber, an antioxidant, etc.) | |
| Isocyanate (total) | 100 pbw |
| 4,4'-methylenebis(cyclohexylisocyanate) | 99 pbw |
| Additives* | 3 pbw |

*including a reaction accelerator, a leveling agent, etc.)

The substrate for casting the above resin raw material mixtures thereon, is a 0.1 mm thick biaxially stretched polyethylene terephthalate (PET) film coated with a release agent. The film was run under tension to keep it flat during casting.

The first layer was formed by casting from the polyol and isocyanate which had been mixed to establish an NCO index of 105. The mixture was cast onto the PET film running at a speed of 0.2 m/min to form the first layer, 1000 mm wide and 0.15 mm thick.

The second layer was formed by casting from the polyol and isocyanate which had been mixed to establish an NCO index of 102. The mixture was cast onto the first layer to form the second layer, 1050 mm wide and 0.9 mm thick.

The two nozzles for the first and second layers were 30 cm apart, and the space between them was kept at room temperature, so that the first layer still retained fluidity due to incomplete reaction when the second layer was formed thereon.

The liquid two layers formed on the PET film were introduced into an oven (at 150° C.) so that the two layers were cured continuously and simultaneously. Thus, there was obtained a double-layer polyurethane film.

The double-layer polyurethane film was bonded to a glass sheet by the aid of an adhesive, with the second layer facing to the glass sheet. The first layer was pretreated and then a glass sheet was bonded thereto by the aid of urethane sealant ("Hamatite" from Yokohama Rubber Co., Ltd.). Thus, there was obtained a test piece for measurement of the shear stress between the first and second layers. The first glass sheet measures 25 mm wide, 90 mm long, and 5 mm thick. The second glass sheet measures 25 mm wide, 90 mm long, and 5 mm thick. The bond area for the urethane sealant measures 25 mm wide and 8 mm long (and hence 2 cm$^2$).

The test piece was tested for shear bond strength. The initial bond strength was 48 kg/cm$^2$. The bond strength after moisture resistance test (at 38° C. and 95% RH, for 2 weeks) was 35 kg/cm$^2$. The bond strength after warm water immersion test (at 40° C. for 2 weeks) was 40 kg/cm$^2$. Failures occurred only at the urethane sealant and no delamination occurred between the two layers.

EXAMPLE 2

A double-layer film was prepared in the same manner as in Example 1 except that the formulation of the polyurethane for the second layer was changed as follows, and the thickness of the second layer was changed to 1 mm. Polyurethane resin for the second layer:

| | |
|---|---|
| Polyol (total) | 100 pbw |
| Polycaprolactonediol (MW = 1200) | 49.5 pbw |
| Polycaprolactonetriol (MW = 1500) | 40.5 pbw |
| 1,4-butanediol | 9 pbw |
| Additives* | 1 pbw |
| *including a light stabilizer, an UV light absorber, an antioxidant, etc.) | |
| Isocyanate (total) | 100 pbw |
| 4,4'-methylenebis(cyclohexylisocyanate) | 99 pbw |
| Additives* | 1 pbw |

*including a reaction accelerator, a leveling agent, etc.)

A test piece was prepared in the same manner as in Example 1 except that the urethane sealant was replaced by "Betaseal" (from Sunstar Co., Ltd.). The test piece was tested for shear bond strength. The initial bond strength was 36 kg/cm$^2$. The bond strength after moisture resistance test (at 38° C. and 95% RH, for 2 weeks) was 35 kg/cm$^2$. The bond strength after warm water immersion test (at 40° C. for 2 weeks) was 30 kg/cm$^2$. Failures occurred only at the urethane sealant and no delamination occurred between the two layers.

EXAMPLE 3

A double-layer film was prepared in the same manner as in Example 1 except that the first layer (0.08 mm thick) was cast onto the PET film substrate and preliminarily heated at 50° C. by an oven placed between the first and second nozzles and cooled to room temperature afterwards, and the second layer was cast onto the first layer.

A test piece for measurement of shear bond strength was prepared in the same manner as in Example 1. The initial bond strength was 38 kg/cm$^2$. The bond strength after moisture resistance test (at 38° C. and 95% RH, for 2 weeks) was 36 kg/cm$^2$. The bond strength after warm water immersion test (at 40° C. for 2 weeks) was 33 kg/cm$^2$. Failures occurred only at the urethane sealant and no delamination occurred between the two layers.

Comparative Example 1

A double-layer film was prepared in the same manner as in Example 1 except that the distance between the first and second nozzles was expanded and an oven was installed between them so that the first layer cast onto the running PET film substrate was cured at 150° C. and cooled to room temperature afterwards, and the second layer was cast onto the first layer.

A test piece for measurement of shear bond strength was prepared in the same manner as in Example 1. The initial bond strength was 50 kg/cm$^2$, and failure occurred at the urethane sealant. The bond strength after moisture resistance test (for 2 weeks) and after warm water immersion test (for 2 weeks) was 26 kg/cm$^2$ and 18 kg/cm$^2$, respectively. Delamination occurred between the two layers.

Comparative Example 2

A double-layer film was prepared in the same manner as in Example 2 except that the distance between the first and second nozzles was expanded and an oven was installed between them so that the first layer cast onto the running PET film substrate was cured at 150° C. and cooled to room temperature afterwards and the second layer was cast onto the first layer.

A test piece for measurement of shear bond strength was prepared in the same manner as in Example 2. The initial bond strength was 37 kg/cm², and failure occurred at the urethane sealant. The bond strength after moisture resistance test (for 2 weeks) and after warm water immersion test (for 2 weeks) was 25 kg/cm² and 19 kg/cm², respectively. Delamination occurred between the two layers.

Comparative Example 3

A double-layer film was prepared in the same manner as in Example 3 except that the distance between the first and second nozzles was expanded, and an oven was installed between them so that the first layer cast onto the PET film substrate was cured at 150° C. and cooled to room temperature afterwards, and the second layer was cast onto the first layer.

A test piece for measurement of shear bond strength was prepared in the same manner as in Example 2. The initial bond strength was 37 kg/cm², and failure occurred at the urethane sealant. The bond strength after moisture resistance test (for 2 weeks) and after warm water immersion test (for 2 weeks) was 27 kg/cm² and 21 kg/cm², respectively. Delamination occurred between the two layers.

The process of the present invention provides a double-layer plastic film which has a very high interlaminar bond strength owing to physical mixing and chemical reaction at the interface.

The double-layer film has superior optical properties because the physical mixing and chemical reaction at the interface cause the refractive index to change gradually at the interface.

Even in the case where a substrate coated with a release agent is used, the process of the present invention prevents dewetting because the first layer is covered, immediately after its casting, with the second layer. Therefore, the process of the present invention permits the production of a double-layer film in which the first layer is thin. In addition, the process of the present invention permits the production of a double-layer film of good, uniform optical quality, if it is given an additional step to heat the first layer preliminarily.

The process of the present invention makes it possible to heat the first and second layers simultaneously. In the industrial process involving heating means (such as cure oven) to promote reaction and curing, this permits reduction of oven length which leads to investment reduction, running cost reduction, space saving, and film production cost.

We claim:

1. A process for producing a double-layer film on a flat substrate by reactive casting employing two different reaction-curable resin raw material mixtures substantially free from a solvent, which comprises casting onto the substrate a first unreacted liquid raw material mixture for the first layer, then casting onto the first layer a second unreacted liquid raw material mixture for the second layer while the first raw material mixture still retains its fluidity, and thereafter curing by reaction the two layers simultaneously, wherein each of the raw material mixtures for the two layers is a raw material mixture capable of forming a polyurethane resin and wherein said layers are transparent.

2. The process for producing a double-layer film according to claim 1, wherein the raw material mixtures for the two layers react with each other at the interface of the two layers.

3. The process for producing a double-layer film according to claim 1, wherein one of the raw material mixtures is a raw material mixture capable of forming a polyurethane resin having an energy-absorbing property and penetration resistance, and the other raw material mixture is a raw material mixture capable of forming a polyurethane resin having a self-healing surface property.

4. The process for producing a double-layer film according to claim 1, wherein the total thickness of the double-layer film is from 0.04 to 4 mm.

5. The process for producing a double-layer film according to claim 4, wherein the total thickness of the double-layer film is from 0.04 to 2 mm.

6. The process for producing a double-layer film according to claim 4, wherein the thickness of each layer of the double-layer film is from 0.04 to 2 mm.

7. The process for producing a double-layer film according to claim 1, wherein the substrate is a plastic film.

8. The process for producing a double-layer film according to claim 7, wherein the substrate is a propylene film or a polyethylene terephthalate film.

9. The process for producing a double-layer film according to claim 8, wherein the substrate is a biaxially stretched polyethylene terephthalate film having a thickness of from 0.03 to 0.3 mm.

* * * * *